Feb. 4, 1936.  C. E. GORDON  2,029,658
BATTERY STABILIZER
Filed Nov. 25, 1932  2 Sheets-Sheet 1

Inventor
Cecil E. Gordon
By Clarence A. O'Brien
Attorney

Feb. 4, 1936.    C. E. GORDON    2,029,658
BATTERY STABILIZER
Filed Nov. 25, 1932    2 Sheets-Sheet 2
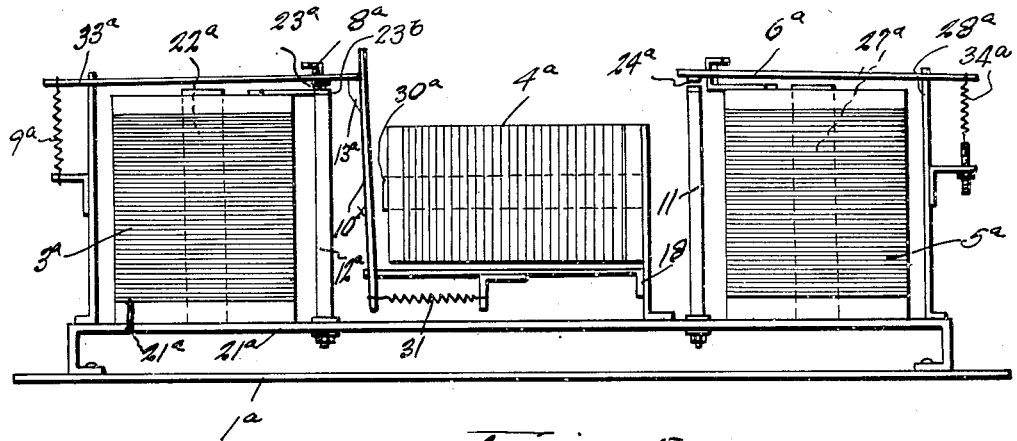
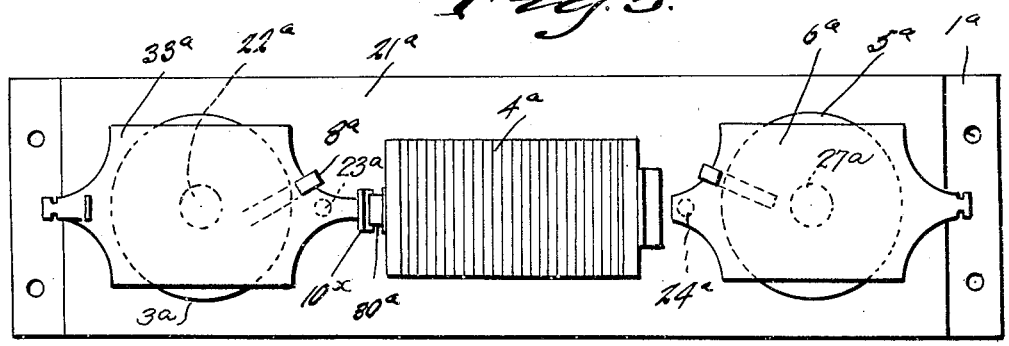
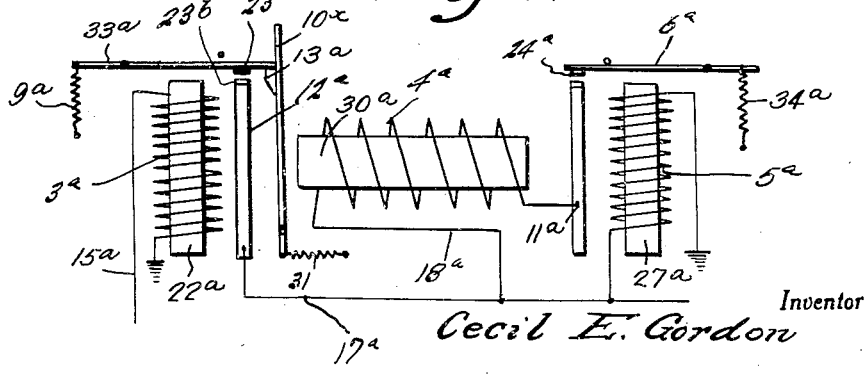
Inventor
Cecil E. Gordon
By Clarence A. O'Brien
Attorney Patented Feb. 4, 1936

2,029,658

UNITED STATES PATENT OFFICE 2,029,658

BATTERY STABILIZER

Cecil E. Gordon, Pocatello, Idaho

Application November 25, 1932, Serial No. 644,393

7 Claims. (Cl. 171—313)

This invention appertains to new and useful improvements in battery stabilization, and more particularly to a device which can be used on any electrical system of any voltage in which a generator is employed to charge a storage battery.

An important object of the invention is to provide a stabilizing device of this character wherein the generator can be set at a high charging rate without danger of overcharging the battery; also the generator charging rate may be set at a high charging rate to care for radio and other electrical appliance without danger of overcharging the battery when these appliances are not in use.

Another important object of the invention is to provide a device of an automatic character which will permit the generator charging rate to remain set for varied driving conditions. With this device it is not necessary to burn lights on long trips, even though the generator charging rate may be set high to care for frequent stopping and starting while making short trips.

Still another important object of the invention is to provide a battery stabilizer of the character mentioned which, in event of a broken connection in the external generator circuit, will prevent excessive voltage rising in the internal generator circuit which would damage or burn out the internal winding.

Other very important objects and advantages of the invention will become apparent to the reader of the following specification.

In the drawings:—

Fig. 4 represents another form of the present invention which is mounted differently from that form disclosed in Fig. 1.

Fig. 5 represents a top plan view of the structure shown in Fig. 4.

Fig. 6 represents a diagrammatic view disclosing the wiring of the device shown in Fig. 4.

Figure 1:
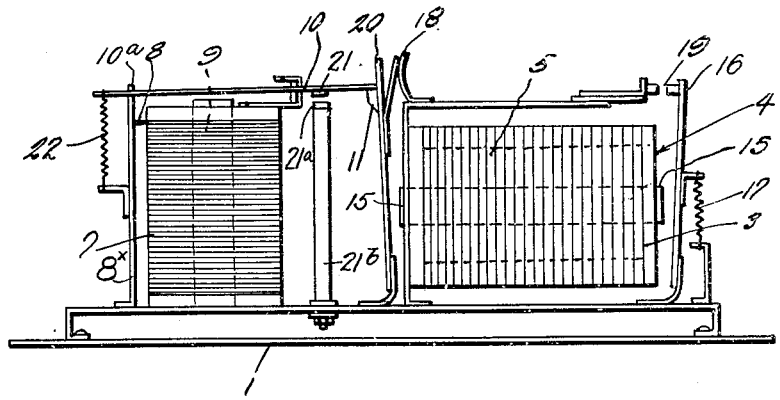
Fig. 1 represents a side elevational view of the compact type of the present invention.
Figure 2:
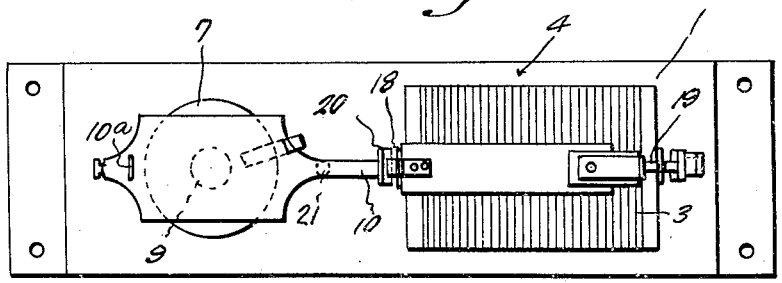
Fig. 2 represents a top plan view of the device disclosed in Fig. 1.
Figure 3:
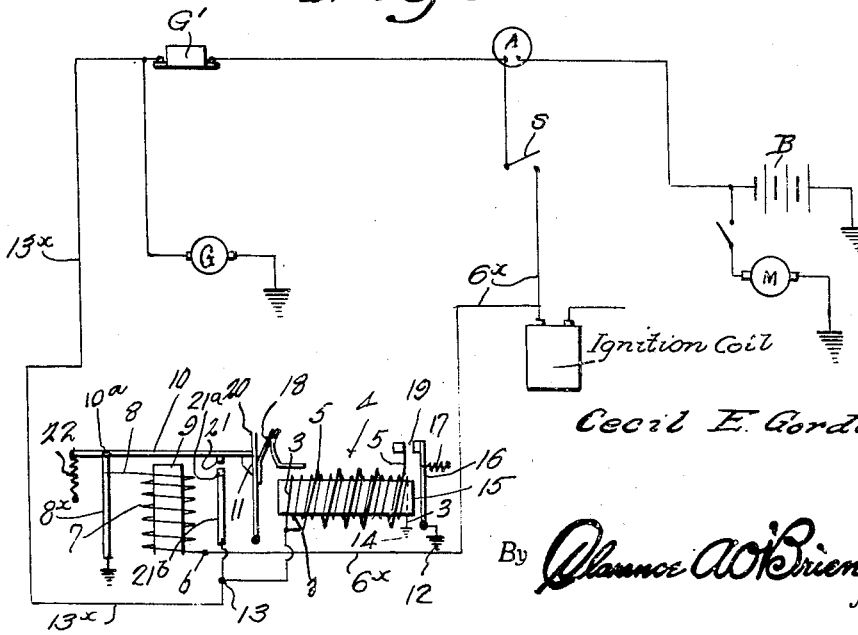
Fig. 3 represents a diagrammatic view disclosing the electrical connections between the electrical devices employed in a system employing the stabilizer device shown in Fig. 1.

Referring to the drawings wherein like numerals designate like parts, it can be seen in Fig. 1, that the device has a base 1 upon which all parts are mounted on some metallic part of the automobile for the purpose of completing the electrical connection to the grounded side of the battery B. The coils 3 and 7 on cores 15 and 9 respectively of the electro-magnets are wound with a very fine wire many times, consuming approximately one-fifth ampere and six volts. The outer winding 5 (Fig. 3) is wound with a larger wire having low resistance.

A wire $6x$ connected to the battery B and to the ignition switch S, gas gauge or any other terminal from which the current may be taken when the ignition switch is "on", is connected to the terminal 6 of winding 7. This current winding 7 is grounded as at 8, to the frame member $8x$ completing the circuit. This energizes core 9, which exerts its magnetic effect upon the armature 10 which is pivoted as at $10a$, thus pulling it towards the core 9 until the end of the armature 10 rests upon the catch member 11 on an armature 20, which prevents point 21 carried by armature 10 from closing against fixed point $21a$ carried on a member $21b$ of base 1. Another wire $13x$ is connected from the generator side of the cut-out G' to terminal 13.

When the generator starts charging, it supplies current to the winding 3 on core 15 and from there to ground at 14. This energizes core 15, which exerts its magnetic pull upon the armature 16, thus pulling it towards the core 15 against the resistance of the spring 17, which is adjusted so that the voltage in the winding 3 is approximately eight and one-half volts (on a six volt system) before it will actuate armature 16.

The spring 18 controlling armature 20 is of greater tension than spring 17, thus requiring a stronger pull to actuate armature 20 than can be secured from winding 3. When the points 19 of armature 16 have engaged, through actuation of armature 16 due to the current in winding 3, the current flows from terminal 13 also through winding 5, through points 19 and then to ground 12 through armature 16. This increased current will increase the magnetism in core 15 sufficiently to pull armature 20 toward the core 15 against the resistance of spring 18.

The movement of the armature 20 pulls trip 11 (which is a part of armature 20) out from under the end of armature 10, allowing the points 21, $21a$ to engage. Due to lower resistance of circuit $21b$, $21a$, 21, 10, and $8x$, the greater portion of the current will then flow from terminal 13 direct through points 21, $21a$ to ground $8x$ through the armature 10. This direct ground of generator G will cause the generator voltage to drop to approximately zero, and hence the stabilizer which shunts the circuit between the generator G and battery B will prevent overcharging of the battery.

The points 21, $21a$ (Fig. 3) will remain in closed position until ignition switch S is turned to "off" position, and at this time, the circuit through coil 7 is broken and core 9 becomes demagnetized, and spring 22 will pull armature 10 away from core 9, opening the points 21, 21a and allowing catch 11 to again pass under end of the armature 10. The parts are now in the original set position.

A modification of the invention is shown in Figs. 4, 5 and 6. This modification includes a base 1a upon which all the parts are mounted and which is to be mounted on some metallic part of an automobile by bolts or rivets for completing the electrical circuit to the grounded side of the battery.

The coils of electro-magnets 5a, 3a are made of a very fine wire with many turns, consuming approximately one-fifth of an ampere at six volts. The coil of electro-magnet 4a is wound with a larger wire having less turns and a much lower resistance than the coils of electro-magnets 5a—3a. A wire 15a is connected to the ignition switch S, gas gauge or any other convenient point (as in Fig. 3) from which current may be taken when the ignition switch is in "on" position. This furnishes a supply of current to one end of electro-magnetic coil 3a the other end of which is grounded to the frame 1a.

Coil 3a energizes the electro-magnet core 22a which exerts its magnetic pull upon armature 33a pulling it toward the core 22a until the end of the armature 33a rests upon the catch 13a carried by the armature 10x preventing the point 23a on armature 33a from engaging with the fixed point 23b of member 12a of base 1a. When the motor is started, the generator supplies current through wire 17a to the winding of electro-magnet 5a which winding is grounded as shown. This results in the energization of the core 27a, which exerts its magnetic pull upon armature 6a, pulling it towards the core 27a against the resistance of the retractor spring 34a which is adjusted so that the voltage at the generator is approximately eight and one-half volts (on a six-volt system) before armature 6a lowers, closing points 24a. The electro-magnet coil 4a has less resistance than the electro-magnet coil 5a, and hence the greater part of the current will flow through the wire 18a to the electro-magnet coil 4a and from thence to point 11a which is insulated from the frame 1a, and from thence through points 24a, through armature 6a, to frame 28a (Fig. 4).

This completes the circuit through the electromagnet coil 4a, energizing the core 30a which exerts its magnetic effect upon armature 10x, overcoming the resistance of the spring 31 and pulling catch 13a toward the electro-magnetic coil 4a, allowing the contact points 23a, 23b to engage. Due to the lowered resistance, current will now flow from wire 17a to member 12a which is insulated from the frame, and through points 23a, 23b through the armature 33a, and from thence to the frame which is grounded, thus directly grounding the generator. Points 23a, 23b remain closed until ignition switch is turned to "off" position, at which time core 22a is demagnetized and spring 9a will pull the armature 33a away from core 22a thereby opening points 23a, 23b and allowing trip 13a to again pass under the outer end of armature 33a. The parts are now in the original set position.

My battery stabilizer is an automatic device which, after being properly set, permits proper charging of the battery under all driving conditions. Hence, in using my device it is not necessary to change the charging rate of the generator for winter or summer driving, or for short trips such as around town driving, or for long trips such as across country driving, nor is it necessary to burn the lights during the day time when making long trips to keep from overcharging the battery as my stabilizer will automatically ground the charging circuit as soon as the battery B becomes fully charged.

Without the stabilizer the generator would continue to pass current through the battery B even after it is fully charged, causing it to over-heat and often causing the battery plates to buckle which would greatly shorten the life of the battery. There is no need for guessing at the condition of the battery when using my stabilizer; and there is no danger of burning out the generator winding which is often caused by the generator building up extreme voltage to force current through an over-charged battery.

While the foregoing specification sets forth the invention in specific terms, it is to be understood that numerous changes in the shape, size and materials may be resorted to without departing from the spirit and scope of the invention as claimed hereinafter.

Having thus described my invention what I claim as new is:—

1. In a charging system, a storage battery, a generator for charging the battery, a grounded normally open switch connected with the output of the generator; means tending to close the switch; and electromagnetic means independent of the switch circuit whereby when the voltage at the generator rises above a predetermined point the said first mentioned means will be permitted to operate to close the switch thereby grounding the generator and diverting the excess generated current from the electromagnetic means.

2. In a charging system, a storage battery, a generator for charging the battery, a grounded switch having one contact connected with the output side of the generator; means tending to close the switch; a trip for normally maintaining the switch open; and electromagnetic means independent of the switch circuit whereby when the voltage at the generator rises above a predetermined point the trip is released to permit closing the switch thereby grounding the generator and diverting the excess generated current from the electromagnetic means.

3. In a charging system, a storage battery, a generator for charging the battery, a grounded switch having one contact connected with the output side of the generator; means tending to close the switch; a trip for normally maintaining the switch open; electromagnetic means for operating the trip; a normally open circuit independent of the switch circuit connecting the electromagnetic means to the output side of the generator; and a second electromagnetic means for closing the open circuit, whereby when the voltage at the generator rises a predetermined amount the electromagnetic means will actuate the trip and thereby ground the generator and divert the excess generated current from the circuit of the first and second electromagnetic means.

4. In a charging system, a storage battery, a generator for charging the battery, a grounded switch having its fixed contact connected with the output side of the generator; means tending to close the switch; a trip normally maintaining the switch open; electromagnetic means for operating the trip; a normally open circuit independent of the switch circuit connecting the electromagnetic means to the output side of the generator, a magnetic coil connected with the output side of the generator; a grounded armature operated by said coil, and a fixed contact adjacent the armature and disposed in the open electromagnet circuit adapted to be engaged by the armature when the coil is energized whereby when the voltage at the generator rises to a predetermined amount the coil will actuate the armature and close the electromagnetic circuit thereby releasing the trip and grounding the generator and diverting the excess generated current from the electromagnetic means and coil.

5. In a charging system for automobiles having a motor and having a storage battery and having a generator for charging the battery driven by the motor and having an ignition switch; a grounded magnetic coil connected with the switch and adapted to be energized when the switch is closed; a grounded armature for the coil, a fixed contact connected with the output side of the generator adapted to contact with said armature; a trip normally maintaining the armature spaced from the contact; and electromagnetic means connected to the output side of the generator for operating the trip whereby when the voltage at the generator rises a predetermined amount the electromagnetic means will release the trip and ground the generator.

6. In a charging system for automobiles having a motor and having a storage battery and having a generator for charging the battery driven by the motor and having an ignition switch; a grounded magnetic coil connected with the switch and adapted to be energized when the switch is closed; a grounded armature for the coil, a fixed contact connected with the output side of the generator adapted to contact with said armature; a trip normally maintaining the armature spaced from the contact; a second magnetic coil to operate the trip; a normally open circuit connecting the second coil to the output side of the generator; a third magnetic coil connected with the output side of the generator, and a second grounded armature operated by the third coil; a second fixed contact adjacent the second armature and disposed in the open circuit of the second coil adapted to be engaged by the second armature when the third coil is energized whereby when the voltage at the generator rises sufficiently the third coil will actuate the second armature and ground the second coil and thereby release the magnetic trip and ground the generator through the armature of the first coil.

7. In a charging system for automobiles having a motor and having a storage battery and having a generator for charging the battery driven by the motor and having an ignition switch; a grounded magnetic coil connected with the switch and adapted to be energized when the switch is closed; a grounded armature for the coil, a fixed contact connected with the output side of the generator adapted to contact with said armature; a magnetic trip normally maintaining the armature spaced from the contact; a second magnetic coil operating the trip connected to the output side of the generator, a second grounded armature for the second coil; a second fixed contact adjacent the second armature, the end of second coil being connected to the said second fixed contact, and a third grounded coil operating the second armature and connected with the output side of the generator, said third and first mentioned coils having a higher resistance than the second coil, whereby when the voltage at the generator rises sufficiently the third coil will actuate the second armature and ground the second coil and thereby release the magnetic trip and ground the generator through the armature of the first coil.

CECIL E. GORDON.